United States Patent
Määttänen et al.

(10) Patent No.: US 11,871,356 B2
(45) Date of Patent: Jan. 9, 2024

(54) METHODS AND NODES FOR EFFICIENT MAC CE DESIGN FOR INDICATING MAPPING BETWEEN PATHLOSS REFERENCE AND MULTIPLE SRI

(71) Applicant: TELEFONAKTIEBOLAGET LM ERICSSON (PUBL), Stockholm (SE)

(72) Inventors: Helka-Liina Määttänen, Helsinki (FI); Mats Folke, Vällingby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/919,396

(22) PCT Filed: Apr. 12, 2021

(86) PCT No.: PCT/IB2021/053004
§ 371 (c)(1),
(2) Date: Oct. 17, 2022

(87) PCT Pub. No.: WO2021/214586
PCT Pub. Date: Oct. 28, 2021

(65) Prior Publication Data
US 2023/0239806 A1  Jul. 27, 2023

Related U.S. Application Data

(60) Provisional application No. 63/014,470, filed on Apr. 23, 2020.

(51) Int. Cl.
*H04W 72/23* (2023.01)
*H04W 52/24* (2009.01)
*H04W 72/231* (2023.01)
*H04W 52/54* (2009.01)

(52) U.S. Cl.
CPC ......... *H04W 52/242* (2013.01); *H04W 52/54* (2013.01); *H04W 72/231* (2023.01)

(58) Field of Classification Search
CPC ... H04W 52/14; H04W 52/242; H04W 52/54; H04W 72/231; H04W 72/0446;
(Continued)

(56) References Cited

U.S. PATENT DOCUMENTS

2019/0253986 A1* 8/2019 Jeon ..................... H04L 5/0048
2019/0281588 A1   9/2019 Zhang
(Continued)

FOREIGN PATENT DOCUMENTS

JP  2023505943 A  2/2023

OTHER PUBLICATIONS

3GPP TS 38.321 V16.0.0, "3rd Generation Partnership Project; Technical Specification Group Radio Access Network; NR; Medium Access Control (MAC) protocol specification (Release 16)", Mar. 2020.
(Continued)

*Primary Examiner* — Wei Zhao

(57) ABSTRACT

There is provided a method in a wireless device. The method comprises: receiving a Media Access Control (MAC) Control Element (CE) from a network node, the MAC CE comprising a plurality of octets and a plurality of fields, wherein a first field of the plurality of fields is used to indicate a number of sets of power control parameters in a last octet of the received MAC CE, the sets of power control parameters being associated with a reference signal used for path loss estimation; and sending a transmission to a network node, based at least on a set of power control parameters associated with the reference signal.

20 Claims, 9 Drawing Sheets

(58) Field of Classification Search
CPC . H04W 72/042; H04W 24/08; H04W 56/001; H04W 72/044; H04B 7/0695; H04B 17/318; H04B 7/069
See application file for complete search history.

(56) References Cited

U.S. PATENT DOCUMENTS

| | | | |
|---|---|---|---|
| 2020/0107272 A1 | 4/2020 | He | |
| 2021/0259000 A1* | 8/2021 | Khoshnevisan | H04L 5/0048 |
| 2022/0095083 A1* | 3/2022 | Yeo | H04W 4/06 |
| 2022/0200764 A1 | 6/2022 | You | |

OTHER PUBLICATIONS

Ericsson, Discussion on applicable timing for pathless RS activated/updated by MAC-, 3GPP TSG-RAN WG4 Meeting #93, R4-1914360, Reno, NV, USA, Nov. 18-22, 2019.

LG Electronics Inc., MAC subheader format, 3GPP TSG-RAN WG2 Meeting #99, R2-1709148, Berlin, Germany, Aug. 21-25, 2017.

Samsung, Considerations on the number of pathloss RSs indicated by MAC CE, 3GPP TSG-RAN WG2 Meeting #109bis-e, R2-2002882, Electronic, Apr. 20-Apr. 30, 2020.

Samsung, Remaining issues on the MAC CEs for beam enhancements, 3GPP TSG-RAN WG2 Meeting #110 electronic, R2-2004832, Online, Jun. 1-Jun. 12, 2020.

ISR and Written Opinion dated Jul. 29, 2021 from corresponding application PCT/IB2021/053004.

Written Opinion dated Apr. 11, 2022 from corresponding application PCT/IB2021/053004.

Samsung, Offline discussion 101: EMIMO MAC Corrections—Phase 2, 3GPP TSG-RAN2 meeting #109bis Electronic, R2-2003900, Apr. 20-Apr. 24, 2020.

* cited by examiner

| R | F | LCID | Oct 1 |
| L | Oct 2 |
| L | Oct 3 |

| R | F | LCID | Oct 1 |
| eLCID | Oct 2 |

| R | F | LCID | Oct 1 |
| eLCID | Oct 2 |
| eLCID | Oct 3 |
| L | Oct 4 |
| L | Oct 5 |

Figure 2

| R | Serving Cell ID | BWP ID | Oct 1 |
| R | R | R | R | SRI ID | Oct 2 |
| R | R | PUSCH Pathloss Reference RS ID | Oct 3 |

Figure 4

METHODS AND NODES FOR EFFICIENT MAC CE DESIGN FOR INDICATING MAPPING BETWEEN PATHLOSS REFERENCE AND MULTIPLE SRI

RELATED APPLICATIONS

This application claims the benefits of priority of U.S. Provisional Patent Application No. 63/014,470, entitled "Efficient MAC CE design for indicating mapping between pathloss reference and multiple SRI" and filed at the United States Patent and Trademark Office on Apr. 23, 2020, the content of which is incorporated herein by reference.

TECHNICAL FIELD

The present description generally relates to wireless communication systems, and particularly, to methods for indicating mapping between pathloss reference and multiple SRI.

INTRODUCTION

New Radio (NR)

The new generation mobile wireless communication system (5G) or new radio (NR) supports a diverse set of use cases and a diverse set of deployment scenarios.

Uplink data transmission can be dynamically scheduled using Physical Downlink Control Channel (PDCCH). Similar to downlink, a User Equipment (UE) first decodes uplink grants in PDCCH and then transmits data over Physical Uplink Shared Channel (PUSCH) based on the decoded control information in the uplink grant, such as modulation order, coding rate, uplink resource allocation, etc. Also, a UE needs to determine an uplink power for a PUSCH transmission.

PUSCH Power Control

The PUSCH-PowerControl Information Element (IE), as shown below, provides PUSCH power control parameters including Pathloss Reference Signal (RS) identities/identifiers (IDs) for path loss estimation and a list of Sounding Reference Signal (SRS) resource indication (SRI)-PUSCH-PowerControl elements among which one is selected by the SRS resource indication (SRI) field in the Downlink Control Information (DCI). SRI is the SRS resource indication field in the DCI which provides the per scheduling mapping of SRI to PUSCH pathloss reference ID.

PUSCH-PowerControl The IE PUSCH-PowerControl is used to configure UE specific power control parameter for PUSCH.

PUSCH-PowerControl Information Element

```
-- ASN1START
-- TAG-PUSCH-POWERCONTROL-START
PUSCH-PowerControl ::=            SEQUENCE {
   tpc-Accumulation                ENUMERATED { disabled }
OPTIONAL, -- Need S
   msg3-Alpha                      Alpha
OPTIONAL, -- Need S
   p0-NominalWithoutGrant          INTEGER (-202..24)
OPTIONAL, -- Need M
   p0-AlphaSets                    SEQUENCE (SIZE (1..maxNrofP0-PUSCH-
AlphaSets)) OF P0-PUSCH-AlphaSet  OPTIONAL, -- Need M
   pathlossReferenceRSToAddModList SEQUENCE (SIZE (1..maxNrofPUSCH-
PathlossReferenceRSs)) OF PUSCH-PathlossReferenceRS
OPTIONAL, -- Need N
   pathlossReferenceRSToReleaseList SEQUENCE (SIZE (1..maxNrofPUSCH-
PathlossReferenceRSs)) OF PUSCH-PathlossReferenceRS-Id
OPTIONAL,  -- Need N
   twoPUSCH-PC-AdjustmentStates    ENUMERATED {twoStates}
OPTIONAL, -- Need S
   deltaMCS                        ENUMERATED {enabled}
OPTIONAL, -- Need S
   sri-PUSCH-MappingToAddModList   SEQUENCE (SIZE (1..maxNrofSRI-PUSCH-
Mappings)) OF SRI-PUSCH-PowerControl
OPTIONAL, -- Need N
   sri-PUSCH-MappingToReleaseList  SEQUENCE (SIZE (1..maxNrofSRI-PUSCH-
Mappings)) OF SRI-PUSCH-PowerControlId
[...]
OPTIONAL -- Need N
}
P0-PUSCH-AlphaSet ::=             SEQUENCE {
   p0-PUSCH-AlphaSetId             P0-PUSCH-AlphaSetId,
   p0                              INTEGER (-16..15)
OPTIONAL, -- Need S
   alpha                           Alpha
OPTIONAL -- Need S
}
P0-PUSCH-AlphaSetId ::=           INTEGER (0..maxNrofP0-PUSCH-AlphaSets-1)
PUSCH-PathlossReferenceRS ::=     SEQUENCE {
   pusch-PathlossReferenceRS-Id    PUSCH-PathlossReferenceRS-Id,
   referenceSignal                 CHOICE {
      ssb-Index                    SSB-Index,
      csi-RS-Index                 NZP-CSI-RS-ResourceId
   }
}
```

-continued

```
PUSCH-PathlossReferenceRS-Id ::=        INTEGER (0..maxNrofPUSCH-
PathlossReferenceRSs-1)
SRI-PUSCH-PowerControl ::=              SEQUENCE {
    sri-PUSCH-PowerControlId                SRI-PUSCH-PowerControlId,
    sri-PUSCH-PathlossReferenceRS-Id        PUSCH-PathlossReferenceRS-Id,
    sri-P0-PUSCH-AlphaSetId                 P0-PUSCH-AlphaSetId,
    sri-PUSCH-ClosedLoopIndex               ENUMERATED { i0, i1 }
}
SRI-PUSCH-PowerControlId ::=            INTEGER (0..maxNrofSRI-PUSCH-Mappings-1)
-- TAG-PUSCH-POWERCONTROL-STOP
-- ASN1STOP
```

PUSCH-PowerControl field descriptions deltaMCS
Indicates whether to apply delta MCS. When the field is absent, the UE applies Ks = 0 in delta_TFC
formula for PUSCH (see TS 38.213 [13], clause 7.1).
msg3-Alpha
Dedicated alpha value for msg3 PUSCH (see TS 38.213 [13], clause 7.1). When the field is absent
the UE applies the value 1.
p0-AlphaSets
configuration {p0-pusch, alpha} sets for PUSCH (except msg3), i.e., {{p0, alpha, index1},
{p0, alpha, index2}, . . .} (see TS 38.213 [13], clause 7.1). When no set is configured, the UE uses the
P0-nominal for msg3 PUSCH, P0-UE is set to 0 and alpha is set according to msg3-Alpha configured
formsg3 PUSCH.
p0-NominalWithoutGrant
P0 value for UL grant-free/SPS based PUSCH. Value in dBm. Only even values (step size 2)
allowed (see TS 38.213 [13], clause 7.1).
pathlossReferenceRSToAddModList
A set of Reference Signals (e.g. a CSI-RS config or a SS block) to be used for PUSCH path loss
estimation. Upto maxNrofPUSCH-PathlossReferenceRSs may be configured (see TS 38.213 [13],
clause 7.1).
sri-PUSCH-MappingToAddModList
A list of SRI-PUSCH-PowerControl elements among which one is selected by the SRI field in DCI
(see TS 38.213 [13], clause 7.1).
tpc-Accumulation
If enabled, UE applies TPC commands via accumulation. If not enabled, UE applies the TPC
command without accumulation. If the field is absent, TPC accumulation is enabled (see TS 38.213
[13], clause 7.1).
twoPUSCH-PC-AdjustmentStates
Number of PUSCH power control adjustment states maintained by the UE (i.e., fc(i)). if the field is
present (n2) the UE maintains two power control states (i.e., fc(i, 0) and fc(i, 1)). If the field is absent, it
maintains one power control state (i.e., fc(i, 0)) (see TS 38.213 [13], clause 7.1).

SRI-PUSCH-PowerControl field descriptions sri-P0-PUSCH-AlphaSetId
The ID of a P0-PUSCH-AlphaSet as configured in p0-AlphaSets in PUSCH-PowerControl.
sri-PUSCH-ClosedLoopIndex
The index of the closed power control loop associated with this SRI-PUSCH-PowerControl.
sri-PUSCH-PathlossReferenceRS-Id
The ID of PUSCH-PathlossReferenceRS as configured in the pathlossReferenceRSToAddModList in
PUSCH-PowerControl.
sri-PUSCH-PowerControlId
The ID of this SRI-PUSCH-PowerControl configuration. It is used as the codepoint (payload) in the SRI
DCI field.

Medium Access Control (MAC) Control Elements (CE)

A MAC protocol data unit (PDU) is a bit string that is byte aligned (i.e. multiple of 8 bits) in length. A MAC service data unit (SDU) is a bit string that is byte aligned (i.e. multiple of 8 bits) in length. A MAC CE is a bit string that is byte aligned (i.e. multiple of 8 bits) in length.

A MAC subheader is a bit string that is byte aligned (i.e. multiple of 8 bits) in length. Each MAC subheader is placed immediately in front of the corresponding MAC SDU, MAC CE, or padding.

A MAC PDU consists of one or more MAC subPDUs. Each MAC subPDU consists of one of the following:
  A MAC subheader only (including padding);
  A MAC subheader and a MAC SDU;
  A MAC subheader and a MAC CE;
  A MAC subheader and padding.

Each MAC subheader corresponds to either a MAC SDU, a MAC CE, or padding.

A MAC subheader except for a fixed sized MAC CE, padding, and a MAC SDU containing uplink (UL) common Control Channel (CCCH), consists of the header fields R/F/LCID/(eLCID)/L. A MAC subheader for a fixed sized MAC CE, padding, and a MAC SDU containing UL CCCH, consists of the two header fields R/LCID. The extended Logical Channel ID (eLCID) field is present when the LCID field is set to specific values and is otherwise absent.

Some examples of MAC subheaders are given in FIGS. 1-3.

FIG. 1 illustrates a R/F/LCID/(eLCID)/L MAC subheader with 8-bit L field.

FIG. 2 illustrates a R/F/LCID/(eLCID)/L MAC subheader with 16-bit L field.

FIG. 3 illustrates a R/LCID/(eLCID) MAC subheader.

MAC CEs with variable size has a subheader which includes an L field. MAC CEs with a constant size has a subheader which does not include an L field, as the size of the MAC CE is determined by the LCID.

Mapping Between SRI and PUSCH Pathloss Reference ID

A network node uses a MAC CE to map (or associate) SRI IDs to PUSCH pathloss reference RS (reference signal) ID. Third Generation Partnership Project (3GPP) Technical Specification (TS) 38.321 16.0.0 currently captures the MAC CE as follows, in section 6.1.3.28:

6.1.3.28 PUSCH Pathloss Reference RS Activation/Deactivation MAC CE

"The PUSCH Pathloss Reference RS Activation/Deactivation MAC CE is identified by a MAC subheader with LCID as specified in Table 6.2.1-1. It has a fixed size of 24 bits:

Serving Cell ID: This field indicates the identity of the Serving Cell, which contains activated/deactivated SRS Resource Set. The length of the field is 5 bits;

BWP ID: This field indicates a UL BWP as the codepoint of the DCI bandwidth part indicator field as specified in TS 38.212, [9], which contains activated/deactivated SRS Resource Set. The length of the field is 2 bits;

SRI ID: This field indicates the SRI PUSCH power control ID identified by sri-PUSCH-PowerControlId as specified in TS 38.331 [5]. The length of the field is 4 bits;

PUSCH Pathloss Reference RS ID: This field indicates the PUSCH Pathloss Reference RS ID identified by PUSCH-PathlossReferenceRS-Id as specified in TS 38.331 [5], which is to be activated/deactivated. The length of the field is 6 bits;

R: Reserved bit, set to 0.

For example, FIG. 4 illustrates a PUSCH Pathloss Reference RS Activation/Deactivation MAC CE, which comprises the fields just described above.

SUMMARY

There are problems with the current MAC CE. For example, the problem is that a DCI selects a one-to-one mapping between a SRI and PUSCH pathloss reference RS ID, but the configuration given by Radio Resource Control (RRC) and MAC can have multiple SRIs mapped to one pathloss reference RS ID. Further, the UE can only follow 4 pathloss reference RS IDs at the same time.

For solving this problem, a prior solution suggested to have a MAC CE where multiple SRIs are included in the MAC CE. As such, the MAC CE is re-designed as shown in FIG. 7.

FIG. 5 illustrates one MAC CE that can include multiple SRI IDs which are associated with the same pathloss RS.

The MAC CE comprises a C1 field, which is used to indicate the presence of the additional SRI ID. The MAC CE comprises also a SUL field, which is used to indicate that the MAC CE applies to a supplementary uplink (SUL) carrier configuration.

The other fields are the same as described above, with regards to FIG. 4.

In this case, the network (NW)/network node includes multiple SRI IDs which have the same mapping for the pathloss reference signal (PL RS), i.e. PUSCH pathloss reference RS ID.

However, this specific MAC CE proposal wastes octets. There are at least three problems with this solution.

Unnecessary Fields

The C1 field is not useful as the number of SRI ID fields can be deduced from the length field in the MAC CE header (not shown in the figure). If the C1 field is included in the overhead calculations, the MAC CE overhead becomes larger.

Overhead

For each new SRI ID added, 3 R-bits are included. For example, with 1 SRI ID included, 20% of the MAC CE consists of R-bits; with 8 SRI IDs included, more than 30% are R bits. As R-bits are not used, this constitutes pure overhead. Therefore, the overhead increases with the number of SRI IDs added.

Size

One octet is added for each new SRI ID, while the SRI ID field is only 4 bits. The size of the MAC CE is 2 octets plus the number of SRI IDs.

Furthermore, there is also a need to be able to remove a mapping between SRI ID and Pathloss reference RS ID. Neither the prior solution nor the current MAC CE can do that. They can only add mappings.

Therefore, a more efficient design is needed, which is also able to remove mappings between SRI IDs and pathloss reference RS ID.

Generally stated, embodiments of this disclosure allow a lean design of the MAC CE and to map Pathloss reference ID with several SRIs based on the following:

Length field (in the subheader) is used to determine the length of the MAC CE;

F field is used to determine the content of the last octet.

To enable removal of mappings between Pathloss reference RS ID and SRIs, the following can be used:

E field is used to control if the MAC CE is adding or removing SRI mappings from the specific pathloss reference RS ID.

According to an aspect, some embodiments include methods performed by a wireless device. For example, a method comprises: receiving a MAC CE from a network node, the MAC CE comprising a plurality of octets and a plurality of fields, wherein a first field of the plurality of fields is used to indicate a number of sets of power control parameters in a last octet of the received MAC CE, the sets of power control parameters being associated with a reference signal used for path loss estimation; and sending a transmission to a network node, based at least on a set of power control parameters associated with the reference signal.

According to another aspect, some embodiments include a wireless device configured, or operable, to perform one or more functionalities (e.g. actions, operations, steps, etc.) as described herein.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the wireless device may comprise one or more functional modules configured to perform one or more functionalities as described herein.

According to an aspect, some embodiments include methods performed by a network node. For example, a method comprises: sending to a wireless device a MAC CE, the MAC CE comprising a plurality of octets, each of which comprising a plurality of fields, wherein a first field of the plurality of fields is used to indicate a number of sets of power control parameters in a last octet of the MAC CE, the sets of power control parameters being associated with a reference signal used for path loss estimation; and receiving a transmission based on at least a set of power control parameters associated with the reference signal.

According to another aspect, some embodiments include a network node configured, or operable, to perform one or more functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to yet another aspect, some embodiments include a non-transitory computer-readable medium storing a computer program product comprising instructions which, upon being executed by processing circuitry (e.g., at least one processor) of the network node or the wireless device, configure the processing circuitry to perform one or more functionalities as described herein.

The advantages/technical benefits of the embodiments of the present disclosure are:

The proposed design contains no unnecessary fields. The size of the MAC CE is determined by the length field in the header instead of using an additional field in the MAC CE.

The number of R-bits included will be 0 for an even number of SRI IDs and 4 for an odd number of R-bits. This means that the fraction of R-bits will decrease as the number of SRI IDs is added.

One octet is added for every other SRI ID. This means that the size of the MAC CE is 2 plus CEIL (number of SRI IDs divided by 2) where CEIL( ) is the ceiling function, where the input is rounded up to the closest integer.

Further functionality is enabled by an E field, which can be added to state if the MAC CE is adding or removing SRI mappings from the specific pathloss reference RS ID.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIG. 2 illustrates a R/F/LCID/(eLCID)/L MAC subheader with 16-bit L field.

FIG. 4 illustrates a PUSCH Pathloss Reference RS Activation/Deactivation MAC CE.

DETAILED DESCRIPTION

Figure 1:
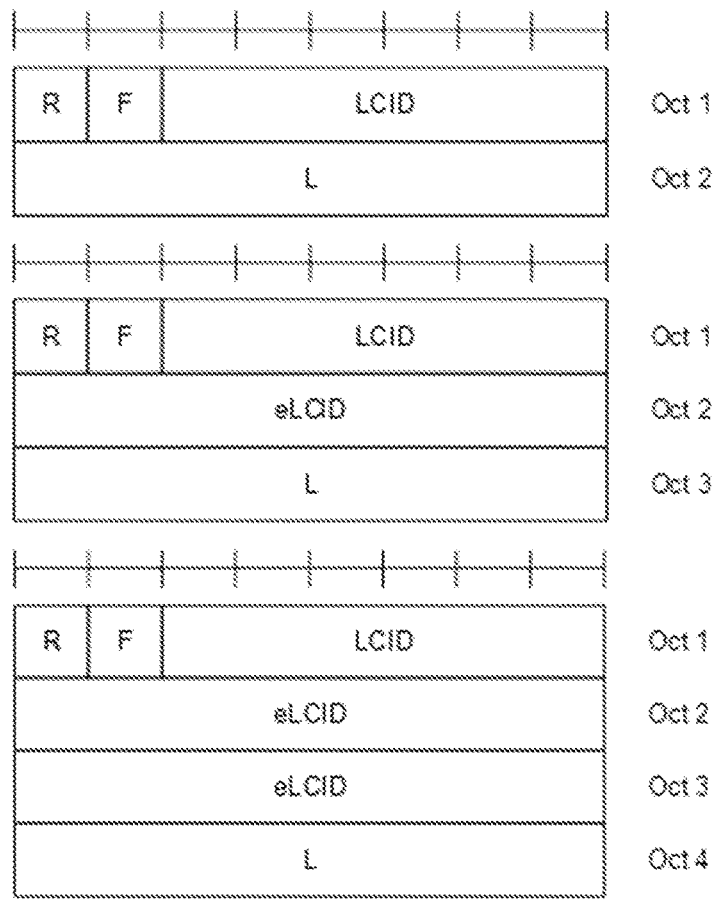
FIG. 1 illustrates a R/F/LCID/(eLCID)/L MAC subheader with 8-bit L field.
Figure 3:
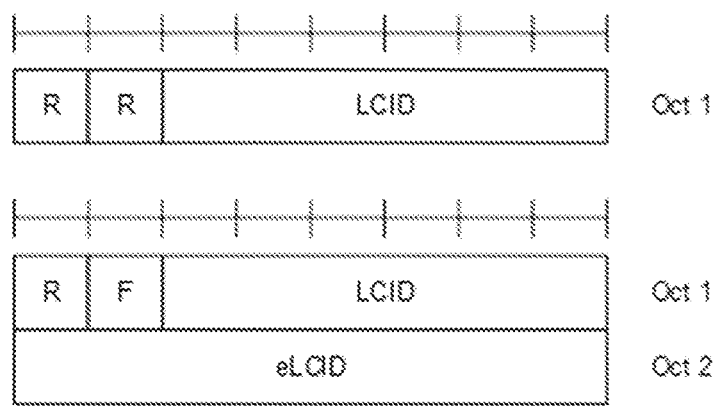
FIG. 3 illustrates R/LCID/(eLCID) MAC subheader.
Figure 5:
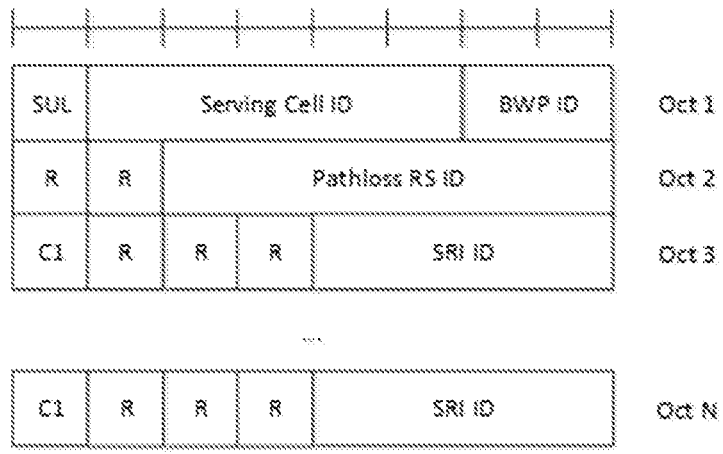
FIG. 5 illustrates a prior solution MAC CE for accommodating multiple SRIs.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes,"

and/or "including" when used herein, specify the presence of stated features, integers, steps, operations, elements, and/or components, but do not preclude the presence or addition of one or more other features, integers, steps, operations, elements, components, and/or groups thereof.

A general example of a PUSCH Pathloss Reference RS Activation/Deactivation MACE CE 100, which allows to resolve the problems mentioned above, is illustrated in FIG. 6. For example, a PUSCH Pathloss Reference RS Activation/Deactivation MAC CE allows to activate or inactivate/deactivate a certain PUSCH Pathloss Reference RS, identified by PUSCH-PathlossReferenceRS-Id as specified in 3GPP TS 38.331. This means that a certain RS that has been Radio Resource Control (RRC) configured for the UE to be considered as the pathloss reference RS can be activated (e.g. becomes active) or be deactivated (e.g. becomes/stays inactive), as indicated by the MAC CE to the UE. If the pathloss reference RS is active, the UE considers it as available. If it is inactive (e.g. deactivated), the UE assumes it is not available (even though a "placeholder" is RRC configured).

It should be noted that the terms "pathloss reference RS ID" or "pathloss reference ID" or "pathloss reference" or "Pathloss RS ID" can be used interchangeably.

The MAC CE 100 has the following fields:

Serving Cell ID 102: This field indicates the identity of the Serving Cell, which contains activated/deactivated SRS Resource Set. The length of the field is 5 bits;

BWP ID 104: This field indicates a UL BWP as the codepoint of the DCI bandwidth part indicator field as specified in 3GPP TS 38.212, which contains activated/deactivated SRS Resource Set. The length of the field is 2 bits;

SRI ID 106: This field indicates the SRI PUSCH power control ID identified by sri-PUSCH-PowerControlId as specified in 3GPP TS 38.331. The length of the field is 4 bits;

Pathloss RS ID 108: This field indicates the PUSCH Pathloss Reference RS ID identified by PUSCH-PathlossReferenceRS-Id as specified in 3GPP TS 38.331, which is to be activated/deactivated. The length of the field is 6 bits;

E 110: indicates whether a mapping (or association) between the Pathloss RS ID and SRI ID(s) is added (or updated if the SRI ID was previously mapped to another Pathloss RS ID) or removed (in which case the SRI ID(s) are not mapped to any Pathloss RS ID). If the field is set to one value, the mappings are added/updated. If the field is set to another value, the mappings are removed. The length of the field is 1 bit;

F 112: indicates the presence of one SRI ID in the last octet. If set to one value, there is 1 SRI ID field and 4 R-bits in the last octet. If set to another value, there are 2 SRI ID fields and no R-bits in the last octet. The length of the field is 1 bit;

R 114: Reserved bit, set to 0.

As can be seen from the SRI ID field 106, a SRI ID is used to indicate a set of power control elements/parameters. This set of power control parameters can be indicated to be mapped to a reference signal used for pathloss estimation.

Figure 6:
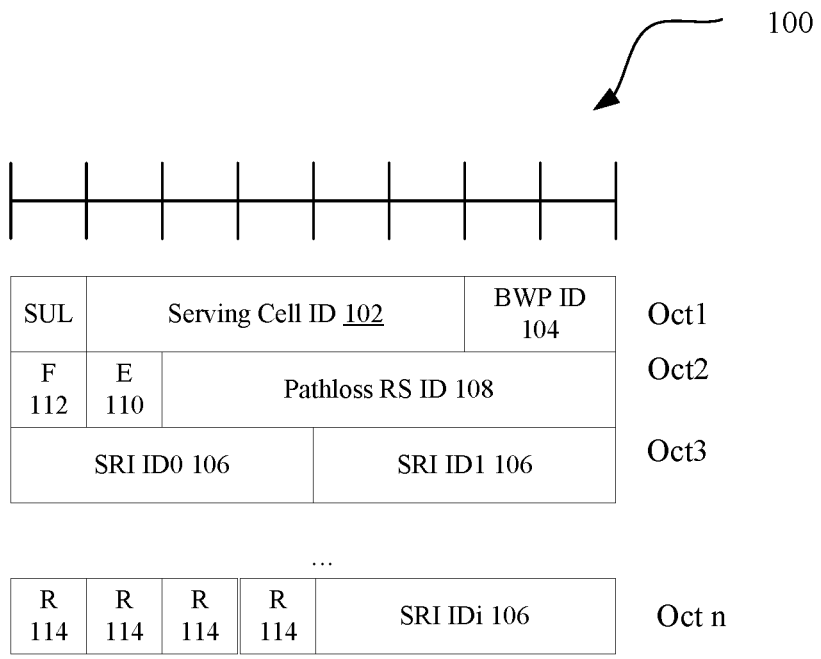
FIG. 6 illustrates a MAC CE with a F field, according to an embodiment of this disclosure.

In a first example, a PUSCH Pathloss Reference RS Activation/Deactivation MAC CE can include one or two SRI fields starting from octet 3 until octet n (see FIG. 6 for example). Octet 2 can include the field F 112, which determines whether the last octet includes one or two SRI fields. In this first example, it should be noted that there may be no E field.

In the UE side, when the UE receives a MAC CE, such as MAC CE 100, the UE determines from the length field how many octets the MAC CE body contains. Further, the UE determines from the F field how many SRI fields the last octet contains. Combining the information from the length field and F field, the UE is able to determine how many SRI fields are mapped (or associated) to one pathloss reference RS. Based on this information, the UE can determine a transmit power for sending an uplink grant/transmission to the network node, for example.

In a second example, the MAC CE includes the E field, in addition to the F field. The E field determines how the UE should update the mapping of SRI to pathloss reference RS. More specifically, the E field can indicate whether a mapping between the Pathloss RS ID and SRI ID(s) are added (or updated if the SRI ID was previously mapped to another Pathloss RS ID) or removed (in which case the SRI ID(s) are not mapped to any Pathloss RS ID). For example, if the field is set to one value, the mappings are added/updated. If the field is set to another value, it means that the mappings given in the MAC CE should be removed by the UE.

Alternatively, the E field can control whether the UE should forget any or all earlier mappings associated with the SRI and pathloss reference RS given in this MAC CE, or if the UE should consider the MAC CE as providing additional mappings for the indicated SRI. In this case, for example, if the E field is set to the value of zero (0), the UE forgets the mappings, if the E field is set to 1, the UE considers a mapping between SRI ID and the pathloss reference RS ID as an additional mapping. As such, the E field indicate to the UE about the mappings to be either forgotten or added, depending on the value of the E field.

When the UE receives the MAC CE in this second example, the UE can determine the number of SRI fields mapped to one pathloss reference RS, based on the length field and F field. Furthermore, from the E field, the UE can determine if the SRI fields are updated/added or removed with respect to the previous configuration the UE had for the mappings. Based on this information (i.e. the length and the F and E fields), the UE can determine a transmit power for sending an uplink grant/transmission to the network node, for example.

Figure 7:
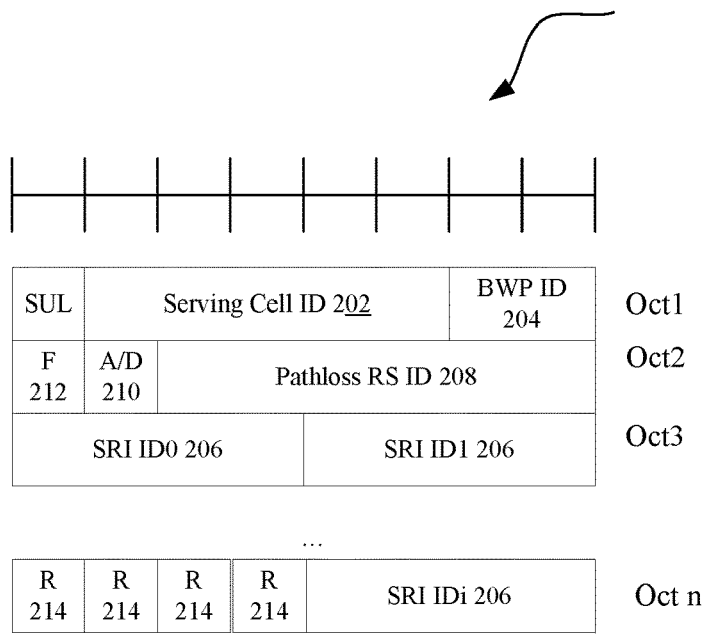
FIG. 7 illustrates a MAC CE with an A/D field, according to an embodiment.

Another example of a PUSCH Pathloss Reference RS Activation/Deactivation MAC CE 200 is illustrated in FIG. 7.

In this example, the field E 110 (of FIG. 6) is replaced by an A/D field 210.

More specifically, the MAC CE 200 of FIG. 7 comprises the following fields:

Serving Cell ID 202: This field indicates the identity of the Serving Cell, which contains activated/deactivated SRS Resource Set. The length of the field is 5 bits;

BWP ID 204: This field indicates a UL BWP as the codepoint of the DCI bandwidth part indicator field as specified in 3GPP TS 38.212, which contains activated/deactivated SRS Resource Set. The length of the field is 2 bits;

SRI ID 206: This field indicates the SRI PUSCH power control ID identified by sri-PUSCH-PowerControlId as specified in 3GPP TS 38.331. The length of the field is 4 bits;

Pathloss RS ID 208: This field indicates the PUSCH Pathloss Reference RS ID identified by PUSCH-PathlossReferenceRS-Id as specified in 3GPP TS 38.331, which is to be activated/deactivated. The length of the field is 6 bits;

A/D 210: This field indicates whether to activate or deactivate the indicated PUSCH Pathloss Reference RS. The field is set to one value to indicate activation, and to another value to indicate deactivation. The length of the field is 1 bit;

F 212: indicates the presence of one SRI ID in the last octet. If set to one value, there is 1 SRI ID field and 4 R-bits in the last octet. If set to another value, there are 2 SRI ID fields and no R-bits in the last octet. The length of the field is 1 bit;

R 214: Reserved bit, set to 0.

In this example, the MAC CE includes the A/D field 210. This field indicates whether to activate or deactivate the indicated PUSCH Pathloss Reference RS. For example, the field is set to 1 to indicate activation, otherwise it indicates deactivation.

When the UE receives the MAC CE 200, the UE can determine if the indicated PUSCH Pathloss Reference RS is activated or inactivated. If the A/D 210 field indicates activation, then the UE activates the PUSCH Pathloss Reference RS. Based on this information, the UE can determine which are the activated PUSCH pathloss Reference RSs that may be used for determining the transmit power for sending an uplink transmission to the network node, for example. If the A/D 210 field indicates inactivation, then the UE does not use the inactivated PUSCH pathloss reference RS for determining the transmit power.

Figure 8:
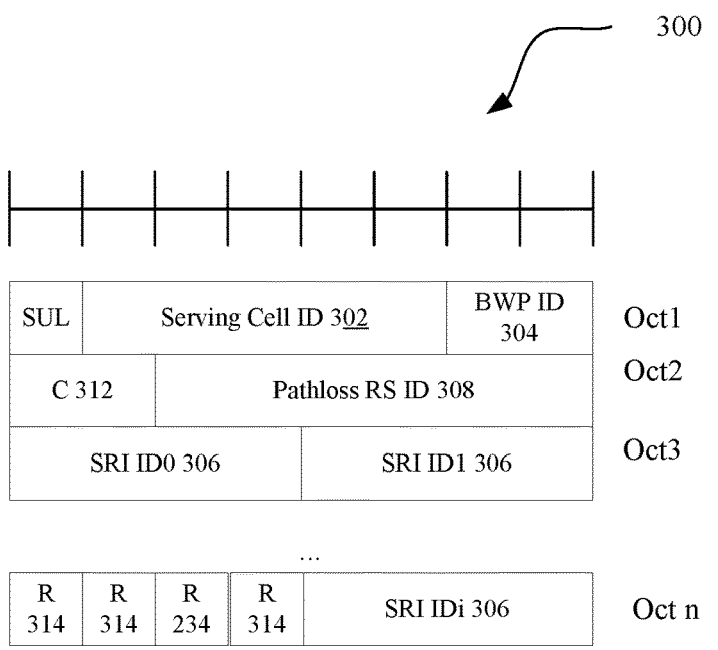
FIG. 8 illustrates a MAC CE with a C field, according to an embodiment of this disclosure

Another example of a PUSCH Pathloss Reference RS Activation/Deactivation MAC CE 300 is illustrated in FIG. 8.

In this example, the field C 312 can replace 2 of the 3 fields, E field 110, A/D field 210 and F field 112 or 212.

More specifically, the MAC CE 300 of FIG. 8 comprises the following fields:

Serving Cell ID 302: This field indicates the identity of the Serving Cell, which contains activated/deactivated SRS Resource Set. The length of the field is 5 bits;

BWP ID 304: This field indicates a UL BWP as the codepoint of the DCI bandwidth part indicator field as specified in 3GPP TS 38.212, which contains activated/deactivated SRS Resource Set. The length of the field is 2 bits;

SRI ID 306: This field indicates the SRI PUSCH power control ID identified by sri-PUSCH-PowerControlId as specified in 3GPP TS 38.331. The length of the field is 4 bits;

Pathloss RS ID 308: This field indicates the PUSCH Pathloss Reference RS ID identified by PUSCH-PathlossReferenceRS-Id as specified in 3GPP TS 38.331, which is to be activated/deactivated. The length of the field is 6 bits;

C 3012: This field indicates options on how a UE should interpret the MAC CE 300. For example, one codepoint indicates that the MAC CE deactivates the PUSCH Pathloss Reference RS. A second codepoint indicates that the MAC CE activates the PUSCH Pathloss Reference RS but does not change the SRI mappings with the reference signal, given by RRC. A third codepoint indicates that the MAC CE activates the PUSCH Pathloss Reference RS and adds SRI ID mappings to the PUSCH Pathloss Reference RS, as given by the RRC configured mappings. A fourth codepoint indicates that the MAC CE activates the PUSCH Pathloss Reference RS and replaces the SRI ID mappings to the PUSCH Pathloss Reference RS as given by the RRC configured mappings, with another SRI ID mapping to the PUSCH Pathloss Reference RS. For another example, one codepoint can indicate that the MAC CE deactivates the PUSCH Pathloss Reference RS. A second codepoint can indicate that the MAC CE activates the PUSCH Pathloss Reference RS and has one SRI ID in the last octet. A third codepoint can indicate that the MAC CE activates the PUSCH Pathloss Reference RS and has two SRI ID in the last octet. A fourth codepoint can indicate that the MAC CE activates the PUSCH Pathloss Reference RS but does not change the SRI mappings, thus the MAC CE does not have any octets with SRI IDs.

F (optional, not shown): indicates the presence of one SRI ID in the last octet. If set to one value, there is 1 SRI ID field and 4 R-bits in the last octet. If set to another value, there are 2 SRI ID fields and no R-bits in the last octet. The length of the field is 1 bit;

R 314: Reserved bit, set to 0.

As a note, there is no F field illustrated in FIG. 8. In this case, the number of SRIs can be fixed and pre-embedded in the C field 312, for example.

In this example, the MAC CE 300 includes a C field 312, instead of the E, A/D or F fields. The C field 312 can have a length of 2 (bits). This field indicates options on how the UE should interpret the MAC CE.

For example, one codepoint indicates that the MAC CE deactivates the PUSCH Pathloss Reference RS. A second codepoint indicates that the MAC CE activates the PUSCH Pathloss Reference RS but does not change the SRI mapping given by RRC. A third codepoint indicates that the MAC CE activates the PUSCH Pathloss Reference RS and adds SRI ID mappings to the PUSCH Pathloss Reference RS to the RRC configured mapping. A fourth codepoint indicates that the MAC CE activates the PUSCH Pathloss Reference RS and replaces the SRI ID mappings to the PUSCH Pathloss Reference RS to the RRC configured mapping.

When the UE receives the MAC CE 300, the UE can determine the indication contained in the C field 312 and apply the indication. The UE can activate the PUSCH Pathloss Reference RS and update it or add more SRI ID mappings. Based on this information, the UE can further determine a transmit power for sending an uplink grant/transmission to the network node, for example. If the indication from the C field 312 is to deactivate the PUSCH Pathloss Reference RS, then the UE deactivates the PUSCH Pathloss Reference RS.

It should be understood that when it is stated that a MAC CE indicates or activates etc., it means that it is the UE or the MAC entity of the UE which performs the indication, activation etc., using the information provided in the MAC CE.

Figure 9:
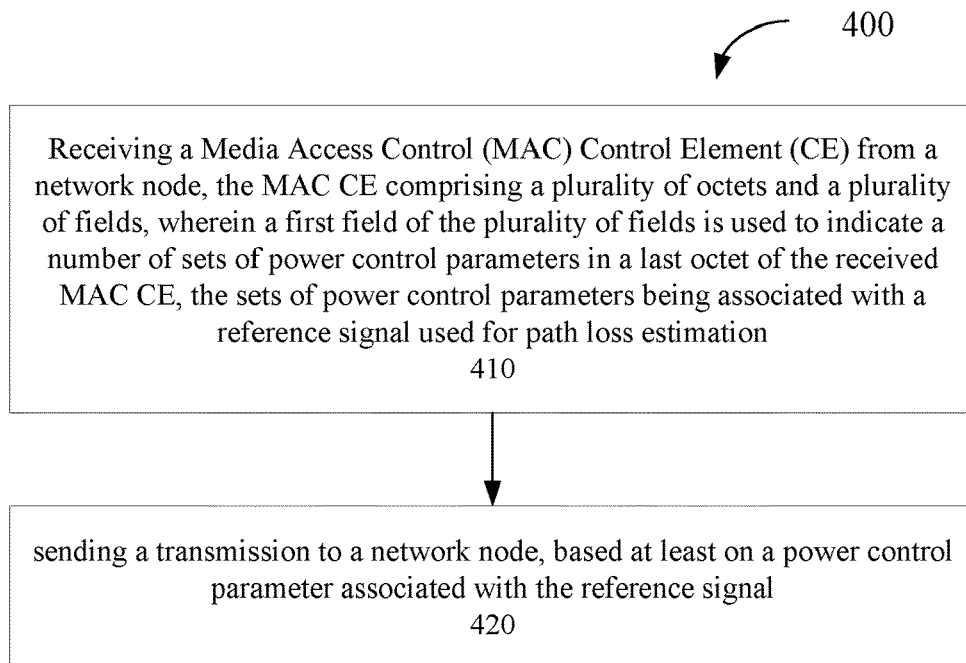
FIG. 9 is a flow chart of a method in a wireless device, in accordance with an embodiment.

Now turning to FIG. 9, a flow chart of a method 400 in a wireless device for power control will be described. Method 400 comprises:

Step 410: receiving a MAC CE from a network node, the MAC CE comprising a plurality of octets and a plurality of fields, wherein a first field of the plurality of fields is used to indicate a number of sets of power control parameters in a last octet of the received MAC CE, the sets of power control parameters being associated with a reference signal used for path loss estimation; and Step 420: sending a transmission to a network node, based at least on a set of power control parameters associated with the reference signal.

For example, the reference signal can be indicated by the field for Pathloss RS ID and the power control parameters can be indicated by the fields for SRI IDs. For instance, one SRI ID (or one field for SRI ID) can indicate one set of power control parameters, where a set can comprise one or more power control parameters. A mapping between the SRI IDs and the Pathloss RS ID can be established in the MAC CE so that the power control parameters indicated by the SRI IDs are associated with the reference signal indicated by Pathloss RS ID.

For example, the wireless device may further determine a total number of sets of power control parameters associated with the reference signal, based on a length of the MAC CE and the first field. For example, the first field can be the F field and the length of the MAC CE can be given by the L field in the MAC CE or is determined by Logical Channel ID (LCID). An example can be shown in FIG. 6, where the octets, starting from the third octet to the last octet, contain SRI IDs. These octets contain 2 SRI IDs per octet, except for the last octet, which can contain one SRI ID or two SRI IDs. Therefore, knowing the size of the MAC CE and the number of SRI IDs in the last octet, the UE can determine a total number of SRI IDs.

In some examples, the MAC CE may further comprise a second field for indicating the reference signal. For example, the second field may be the field comprising/indicating the Pathloss RS ID.

In some examples, the reference signal can be a Sounding Reference Signal (SRS).

In some examples, the first field may indicate a number of one set or two sets of power control parameters in the last octet of the MAC CE. For example, the F field indicates if there are one or two SRI IDs, in the last octet of the MAC CE.

In some examples, the received MAC CE may further comprise a third field.

In some examples, the third field may indicate to the wireless device if a mapping (or an association) between a set of power control parameters and the reference signal is updated or added or removed. In this case, the third field can be the E field. For example, the E field allows to indicate an update, adding or removal of any mappings/associations between the SRI IDs and the Pathloss RS ID, depending on the value of the E field.

In some examples, the third field (e.g. E field) can indicate to the wireless device to remove all previous mappings between a set of power control parameters and the reference signal.

In some examples, the third field can indicate to the wireless device to inactivate or activate path loss estimation for uplink transmissions based on the reference signal (identified to be used for path loss estimation). In this case, the third field can be the A/D field. The path loss estimation is done for the PUSCH channel, for example. Also, when the A/D field (or the MAC CE) indicates activation, it means that the UE can determine which activated PUSCH pathloss Reference RSs (or reference signals) may be used for determining the transmit power for sending an uplink transmission to the network node, for example.

In some examples, the third field can indicate to the UE how to interpret the received MAC CE. In this case, the third field can be the C field.

For example, the third field (e.g. C field) may comprise: a first codepoint that indicates to the wireless device to deactivate the path loss estimation for uplink transmissions (e.g. PUSCH Path loss estimation); a second codepoint that indicates to the wireless device to activate the PUSCH Path loss estimation, but does not change a mapping between the sets of power control parameters and the reference signal; a third codepoint that indicates to the wireless device to activate the PUSCH Path loss estimation and to add a set of power control parameters to be mapped to the reference signal; and a fourth codepoint that indicates to the wireless device to activate the PUSCH Path loss estimation and to replace a set of power control parameters with another set of power control parameters to be mapped to the reference signal.

Figure 10:
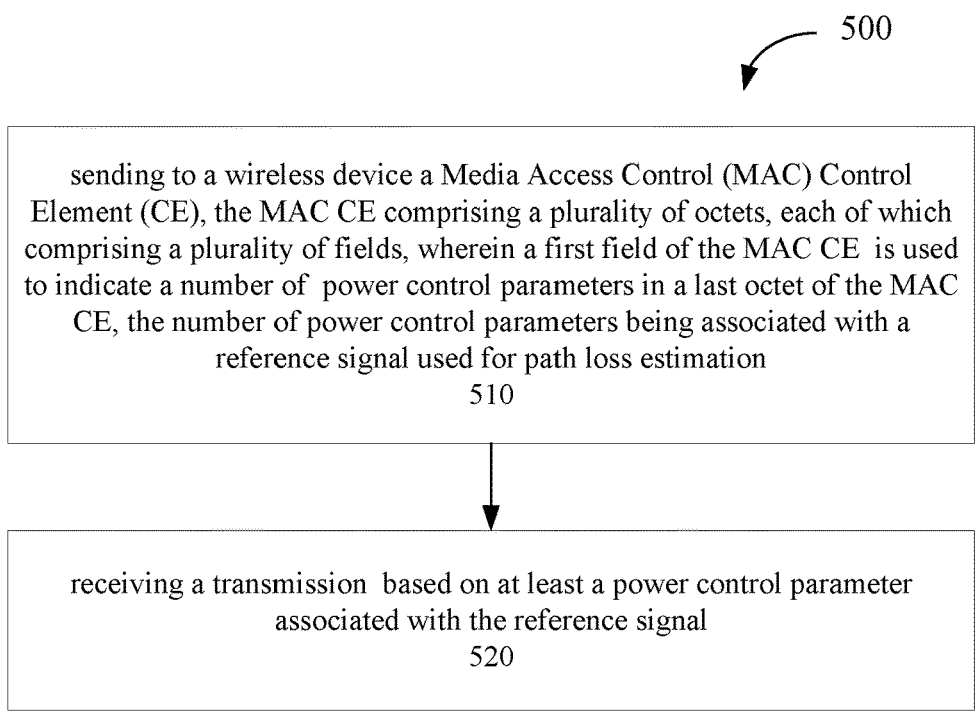
FIG. 10 is a flow chart of a method in a network node, in accordance with an embodiment.

FIG. 10 illustrates a flow chart of a method 500 in a network node, such as gNB, for power control. Method 500 comprises:

Step 510: sending to a wireless device a Media Access Control (MAC) Control Element (CE), the MAC CE comprising a plurality of octets, each of which comprising a plurality of fields, wherein a first field of the plurality of fields is used to indicate a number of sets of power control parameters in a last octet of the MAC CE, the set of power control parameters being associated with a reference signal used for path loss estimation; and Step 520: receiving a transmission, based on at least a set of power control parameters associated with the reference signal.

For example, the reference signal can be indicated by the field for Pathloss RS ID 108 and the power control parameters can be indicated by the fields for SRI IDs 106. For instance, one SRI ID (or one field for SRI ID) can indicate one set of power control parameters, where a set can comprise one or more power control parameters. A mapping between the SRI IDs and the Pathloss RS ID can be established in the MAC CE so that the power control parameters indicated by the SRI IDs are associated with the reference signal indicated by Pathloss RS ID.

In some examples, a total number of sets of power control parameters associated with the reference signal can be determined based on a length of the MAC CE and the first field.

In some examples, the length of the MAC CE can be given by a L field in the MAC CE or is determined by Logical Channel ID (LCID).

In some examples, the MAC CE further can comprise a second field for indicating the reference signal. For example, the second field may be the field comprising/indicating the Pathloss RS ID.

In some examples, the reference signal can be a Sounding Reference Signal (SRS).

In some examples, the first field can indicate a number of one set or two sets of power control parameters in the last octet of the MAC CE. For example, the F field indicates if there are one or two SRI IDs, in the last octet of the MAC CE.

In some examples, the MAC CE may further comprise a third field.

In some examples, the third field can indicate to the wireless device if a mapping between a set of power control parameters and the reference signal is updated or added or removed. In this case, the third field can be the E field. For example, the E field allows to indicate an update, adding or removal of any mappings/associations between the SRI IDs and the Pathloss RS ID, depending on the value of the E field.

In some examples, the third field (e.g. E field) can indicate to the wireless device to remove all previous mappings between a set of power control parameters and the reference signal.

In some examples, the third field can indicate to the wireless device to inactivate or activate a path loss estimation for uplink transmissions based on the reference signal (to be used for path loss estimation). In this case, the third field can be the A/D field. The path loss estimation is done for the PUSCH channel, for example.

In some examples, the third field can indicate to the UE how to interpret the received MAC CE. In this case, the third field can be the C field.

For example, the third field (e.g. C field) can comprise: a first codepoint that indicates to the wireless device to deactivate a path loss estimation for uplink transmissions based on the reference signal; a second codepoint that indicates to the wireless device to activate the path loss estimation for uplink transmissions based on the reference signal but does not change a mapping between the sets of power control parameters and the reference signal; a third codepoint that indicates to the wireless device to activate the path loss estimation for uplink transmissions based on the reference signal and to add a set of power control parameters to be mapped to the reference signal; and a fourth codepoint that indicates to the wireless device to activate the path loss estimation for uplink transmissions based on the reference signal and to replace a set of power control parameters with another set of power control parameters to be mapped to the reference signal.

As a note, the associations between the sets of power control parameters and the reference signal can be given by mappings between SRI IDs and PUSCH pathloss ID.

Figure 11:
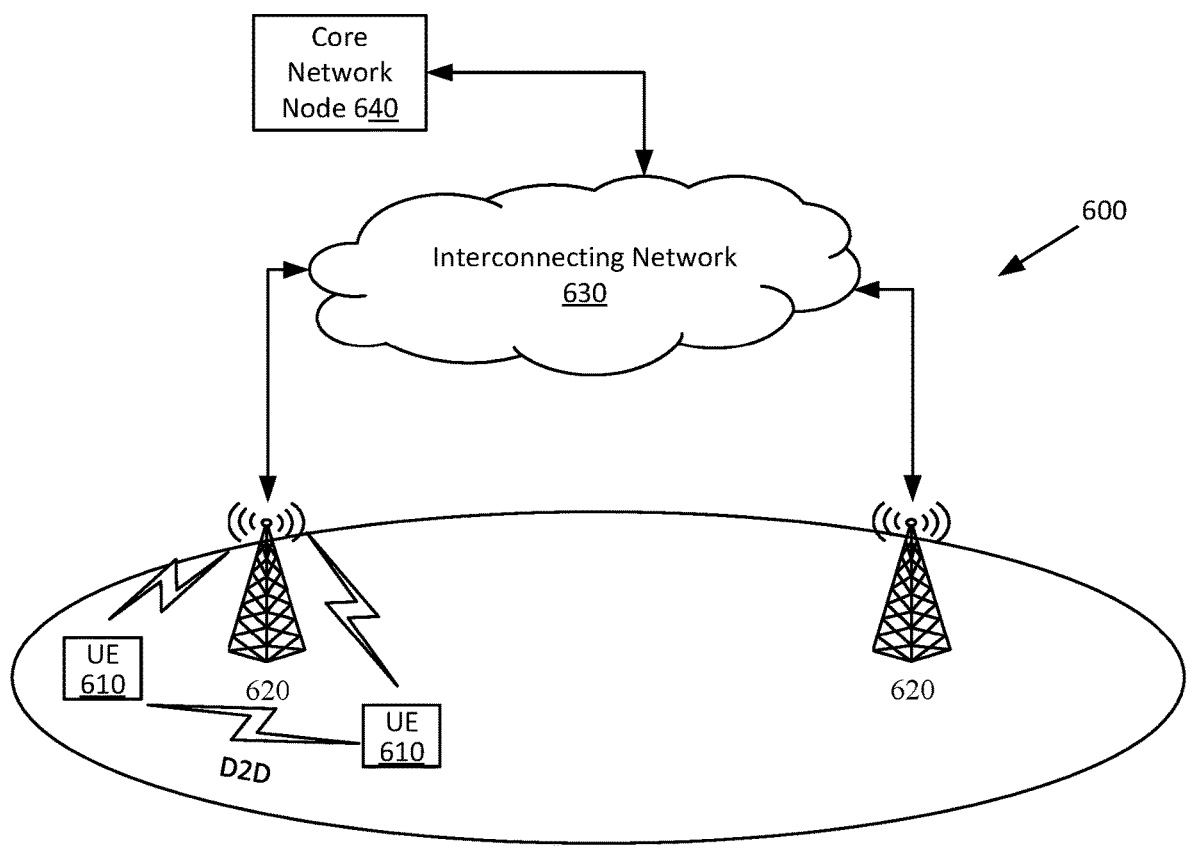
FIG. 11 illustrates one example of a wireless communications system in which embodiments of the present disclosure may be implemented.

FIG. 11 illustrates an example of a wireless network 600 that may be used for wireless communications. Wireless network 600 includes UEs 610 and a plurality of radio network nodes 620 (e.g., Node Bs (NBs) Radio Network Controllers (RNCs), evolved NBs (eNBs), next generation NB (gNBs), etc.) directly or indirectly connected to a core network 630 which may comprise various core network nodes. The network 600 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 610 may be capable of communicating directly with radio network nodes 620 over a wireless interface. In certain embodiments, UEs may also be capable of communicating with each other via device-to-device (D2D) communication. In certain embodiments, network nodes 620 may also be capable of communicating with each other, e.g. via an interface (e.g. X2 in LTE or other suitable interface).

As an example, UE 610 may communicate with radio network node 620 over a wireless interface. That is, UE 610 may transmit wireless signals to and/or receive wireless signals from radio network node 620. The wireless signals may contain voice traffic, data traffic, control signals, and/or any other suitable information. In some embodiments, an area of wireless signal coverage associated with a radio network node 620 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 620 may interface with a radio network controller (not shown). The radio network controller may control network nodes 620 and may provide certain radio resource management functions, mobility management functions, and/or other suitable functions. In certain embodiments, the functions of the radio network controller may be included in the network node 620. The radio network controller may interface with the core network node 640. In certain embodiments, the radio network controller may interface with the core network node 640 via the interconnecting network 630.

The interconnecting network 630 may refer to any interconnecting system capable of transmitting audio, video, signals, data, messages, or any combination of the preceding. The interconnecting network 630 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 640 may manage the establishment of communication sessions and various other functionalities for wireless devices 310. Examples of core network node 640 may include MSC, MME, SGW, PGW, O&M, OSS, SON, positioning node (e.g. E-SMLC), MDT node, etc. Wireless devices 110 may exchange certain signals with the core network node 640 using the non-access stratum layer. In non-access stratum signaling, signals between wireless devices 610 and the core network node 640 may be transparently passed through the radio access network. In certain embodiments, network nodes 620 may interface with one or more other network nodes over an internode interface. For example, network nodes 620 may interface each other over an X2 interface.

Although FIG. 11 illustrates a particular arrangement of network 600, the present disclosure contemplates that the various embodiments described herein may be applied to a variety of networks having any suitable configuration. For example, network 600 may include any suitable number of wireless devices 610 and network nodes 620, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc. Furthermore, the communication system 600 may itself be connected to a host computer (see FIG. 20 for example). The network 600 (with the wireless devices 610 and network nodes 620) may be able to operate in LAA or unlicensed spectrum.

Figure 12:
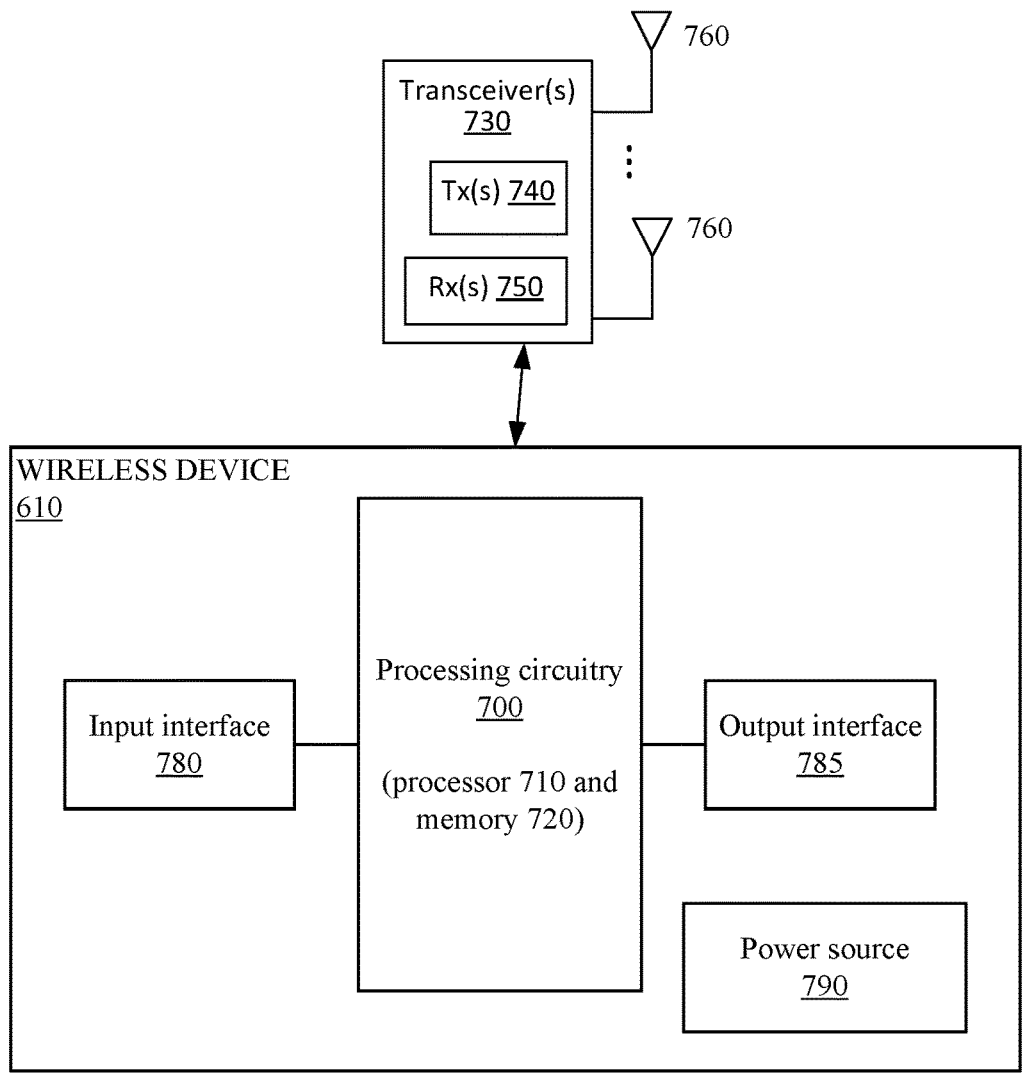
FIGS. 12 and 13 are block diagrams that illustrate a wireless device according to some embodiments of the present disclosure.

FIG. 12 is a schematic block diagram of the wireless device 610 according to some embodiments of the present disclosure. As illustrated, the wireless device 610 includes circuitry 700 comprising one or more processors 710 (e.g., Central Processing Units (CPUs), Application Specific Integrated Circuits (ASICs), Field Programmable Gate Arrays (FPGAs), and/or the like) and memory 720. The wireless device 610 also includes one or more transceivers 730 each including one or more transmitters 740 and one or more receivers 750 coupled to one or more antennas 760. Furthermore, the processing circuitry 700 may be connected to an input interface 780 and an output interface 785. The input interface 780 and the output interface 785 may be referred to as communication interfaces. The wireless device 610 may further comprise power source 790.

In some embodiments, the functionality of the wireless device 610 described above may be fully or partially implemented in software that is, e.g., stored in the memory 720 and executed by the processor(s) 710. For example, the processor 710 is configured to perform all the functionalities performed by the wireless device 610. For example, the processor 710 can be configured to perform any steps of the method 400 FIG. 9.

In some embodiments, a computer program including instructions which, when executed by the at least one processor 710, causes the at least one processor 710 to carry out the functionality of the wireless device 610 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
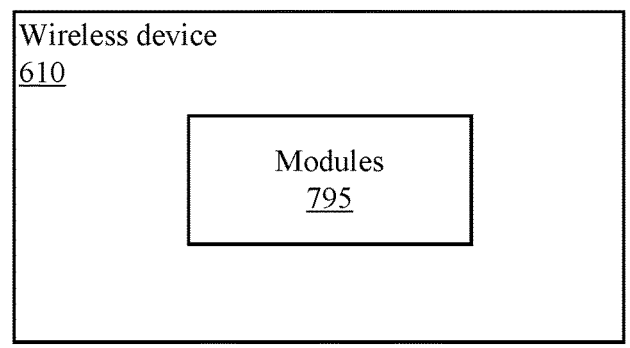

FIG. 13 is a schematic block diagram of the wireless device 610 according to some other embodiments of the present disclosure. The wireless device 610 includes one or more modules 795, each of which is implemented in software. The module(s) 795 provide the functionality of the wireless device 610 described herein. For example, the modules 795 comprise a receiving module operable to perform step 410 of FIG. 9 and a sending module operable to perform step 420 of FIG. 9.

Figure 14:
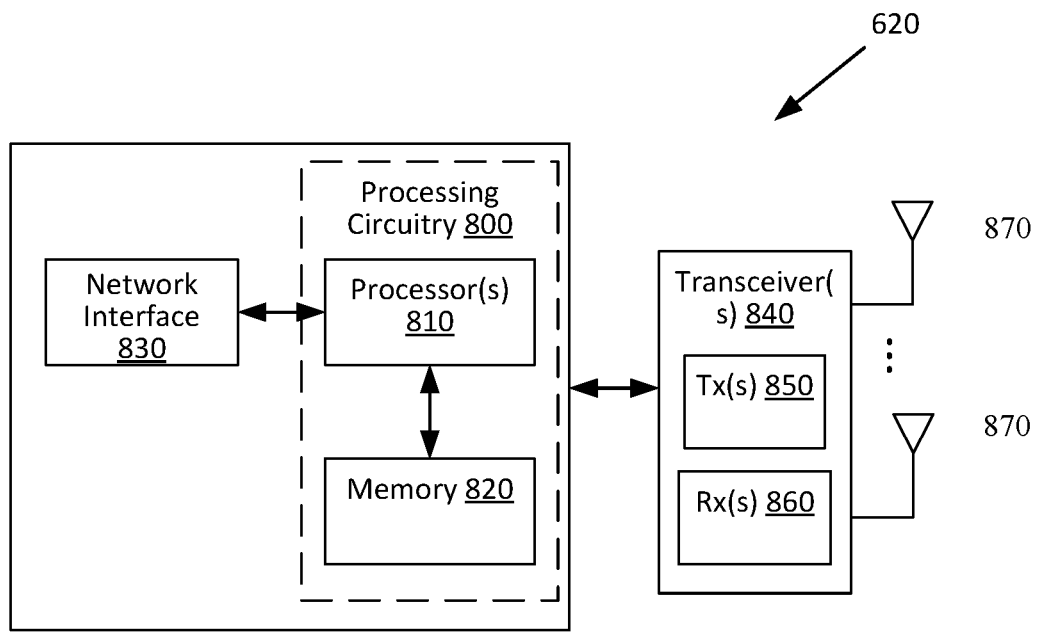
FIGS. 14 and 15 are block diagrams that illustrate a network node according to some embodiments of the present disclosure

FIG. 14 is a schematic block diagram of a network node 620 according to some embodiments of the present disclosure. As illustrated, the network node 620 includes a processing circuitry 800 comprising one or more processors 810 (e.g., CPUs, ASICs, FPGAs, and/or the like) and memory 820. The network node also comprises a network interface 830. The network node 320 also includes one or more transceivers 840 that each include one or more transmitters 850 and one or more receivers 860 coupled to one or more antennas 870. In some embodiments, the functionality of the network node 620 described above may be fully or partially implemented in software that is, e.g., stored in the memory 820 and executed by the processor(s) 810. For example, the processor 810 can be configured to perform any steps of the method 500 of FIG. 10.

Figure 15:
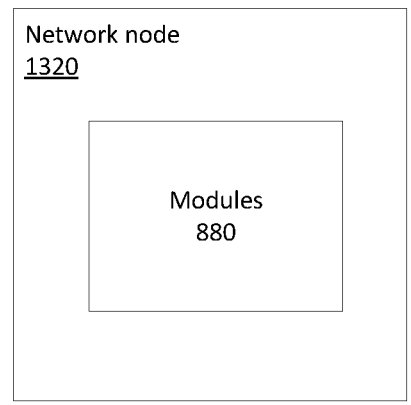

FIG. 15 is a schematic block diagram of the network node 620 according to some other embodiments of the present disclosure. The network node 620 includes one or more modules 880, each of which is implemented in software. The module(s) 880 provide the functionality of the network node 620 described herein. The module(s) 880 may comprise a sending module operable to perform step 510 of FIG. 10 and a receiving module operable to perform step 520 of FIG. 10.

Figure 16:
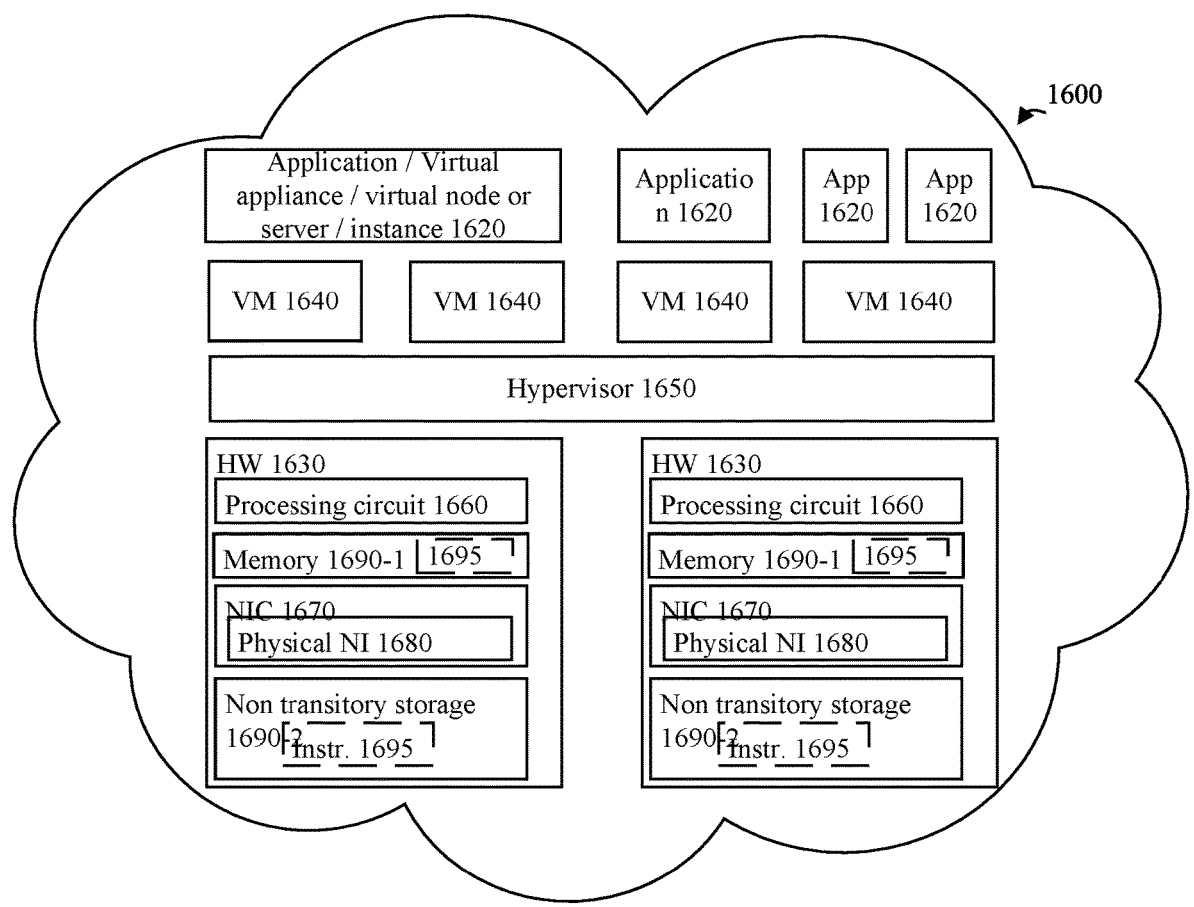
FIG. 16 illustrates a virtualized environment of a network node, according to some embodiments of the present disclosure.

FIG. 16 is a schematic block diagram that illustrates a virtualized embodiment of the wireless device 610 or network node 620, according to some embodiments of the present disclosure. As used herein, a "virtualized" node 1600 is a network node 620 or wireless device 610 in which at least a portion of the functionality of the network node 620 or wireless device 610 is implemented as a virtual component (e.g., via a virtual machine(s) executing on a physical processing node(s) in a network(s)). For example, in FIG. 16, there is provided an instance or a virtual appliance 1620 implementing the methods or parts of the methods of some embodiments. The one or more instance(s) runs in a cloud computing environment 1600. The cloud computing environment provides processing circuits 1630 and memory 1690-1 for the one or more instance(s) or virtual applications 1620. The memory 1690-1 contains instructions 1695 executable by the processing circuit 1660 whereby the instance 1620 is operative to execute the methods or part of the methods described herein in relation to some embodiments.

The cloud computing environment 1600 comprises one or more general-purpose network devices including hardware 1630 comprising a set of one or more processor(s) or processing circuits 1660, which may be commercial off-the-shelf (COTS) processors, dedicated Application Specific Integrated Circuits (ASICs), or any other type of processing circuit including digital or analog hardware components or special purpose processors, and network interface controller(s) (NICs) 1670, also known as network interface cards, which include physical Network Interface 1680. The general-purpose network device also includes non-transitory machine readable storage media 1690-2 having stored therein software and/or instructions 1695 executable by the processor 1660. During operation, the processor(s)/processing circuits 1660 execute the software/instructions 1695 to instantiate a hypervisor 1650, sometimes referred to as a virtual machine monitor (VMM), and one or more virtual machines 1640 that are run by the hypervisor 1650.

A virtual machine 1640 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1640, and that part of the hardware 1630 that executes that virtual machine 1640, be it hardware 1630 dedicated to that virtual machine 1640 and/or time slices of hardware 1630 temporally shared by that virtual machine 1640 with others of the virtual machine(s) 1640, forms a separate virtual network element(s) (VNE).

The hypervisor 1650 may present a virtual operating platform that appears like networking hardware to virtual machine 1640, and the virtual machine 1640 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1620 may be implemented on one or more of the virtual machine(s) 1640, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method performed by a wireless device comprising:
receiving a Media Access Control (MAC) Control Element (CE) from a network node, the MAC CE comprising a plurality of octets and a plurality of fields, wherein a first field of the plurality of fields is used to indicate a number of sets of power control parameters in a last octet of the received MAC CE, the sets of power control parameters being associated with a reference signal used for path loss estimation; and
sending a transmission to the network node, based at least on a set of power control parameters associated with the reference signal.

2. The method of claim 1, further comprising determining a total number of sets of power control parameters associated with the reference signal, based on a length of the MAC CE and the first field.

3. The method of claim 2, wherein the length of the MAC CE is given by a L field in the MAC CE or is determined by Logical Channel ID (LCID).

4. The method of claim 1, wherein the MAC CE further comprises a second field for indicating the reference signal.

5. The method of claim 1, wherein the first field indicates a number of one set or two sets of power control parameters in the last octet of the MAC CE.

6. The method of claim 1, wherein the received MAC CE further comprises a third field.

7. The method of claim 6, wherein the third field indicates to the wireless device if a mapping between a set of power control parameters and the reference signal is updated or added or removed.

8. The method of claim 6, wherein the third field indicates to the wireless device to remove all previous mappings between a set of power control parameters and the reference signal.

9. The method of claim 6, wherein the third field indicates to the wireless device to inactivate or activate path loss estimation for uplink transmissions based on the reference signal.

10. The method of claim 6, wherein the third field indicates to the wireless device how to interpret the received MAC CE.

11. A wireless device comprising a communication interface and processing circuitry connected thereto and configured to:
receive a Media Access Control (MAC) Control Element (CE) from a network node, the MAC CE comprising a plurality of octets and a plurality of fields, wherein a first field of the plurality of fields is used to indicate a number of sets of power control parameters in a last octet of the received MAC CE, the sets of power control parameters being associated with a reference signal used for path loss estimation; and
send a transmission to the network node, based at least on a set of power control parameters associated with the reference signal.

12. A method performed by a network node for power control, the method comprising:
sending to a wireless device a Media Access Control (MAC) Control Element (CE), the MAC CE comprising a plurality of octets, each of which comprising a plurality of fields, wherein a first field of the plurality of fields is used to indicate a number of sets of power control parameters in a last octet of the MAC CE, the sets of power control parameters being associated with a reference signal used for path loss estimation; and
receiving, from the wireless device, a transmission based on at least a set of power control parameters associated with the reference signal.

13. The method of claim 12, wherein a total number of sets of power control parameters associated with the reference signal is given by a length of the MAC CE and the first field.

14. The method of claim 13, wherein the length of the MAC CE is given by a L field in the MAC CE or is determined by Logical Channel ID (LCD).

15. The method of claim 12, wherein the MAC CE further comprises a second field for indicating the reference signal.

16. The method of claim 12, wherein the first field indicates a number of one set or two sets of power control parameters in the last octet of the MAC CE.

17. The method of claim 12, wherein the MAC CE further comprises a third field.

18. The method of claim 17, wherein the third field indicates to the wireless device if a mapping between a set of power control parameters and the reference signal is updated or added or removed.

19. The method of claim 17, wherein the third field indicates to the wireless device to remove all previous mappings between a set of power control parameters and the reference signal.

20. The method of claim 17, wherein the third field indicates to the wireless device to inactivate or activate a path loss estimation for uplink transmissions based on the reference signal.

* * * * *